United States Patent [19]
Sokal

[11] Patent Number: 5,485,361
[45] Date of Patent: Jan. 16, 1996

[54] FLYBACK CHARGING WITH CURRENT MODE CONTROLLED FLYBACK CONVERTER

[76] Inventor: Nathan O. Sokal, Design Automation, Inc., 809 Massachusetts Ave., Lexington, Mass. 02173-3992

[21] Appl. No.: 461,127

[22] Filed: Jun. 5, 1995

Related U.S. Application Data

[63] Continuation of Ser. No. 911,270, Jul. 7, 1992, abandoned, which is a continuation of Ser. No. 667,462, Mar. 11, 1991, abandoned.

[51] Int. Cl.$^6$ ................................................. H02M 3/335
[52] U.S. Cl. ............................ 363/21; 363/19; 315/241 P
[58] Field of Search .......................... 315/241 P; 363/19, 363/21; H02M 3/28, 3/335

[56] References Cited

U.S. PATENT DOCUMENTS

| | | | |
|---|---|---|---|
| 4,070,699 | 1/1978 | Einbinder | 363/20 |
| 4,104,714 | 8/1978 | Smith et al. | 363/21 |
| 4,146,832 | 3/1979 | McConnell | 323/17 |
| 4,272,806 | 6/1981 | Metzger | 363/21 |
| 4,489,369 | 12/1984 | Ginsberg | 363/21 |
| 4,546,421 | 10/1985 | Bello et al. | 363/21 |
| 4,837,495 | 6/1989 | Zansky | 323/222 |

*Primary Examiner*—Jeffrey L. Sterrett
*Attorney, Agent, or Firm*—Fish & Richardson

[57] ABSTRACT

A flyback charger for an energy-storage capacitor has a controller for causing the energy-storage pulses of current in the transformer primary winding and the energy-delivery pulses of current in the transformer secondary winding to be nearly flat-topped. The controller includes a peak-current-commanding current-mode control or a valley-current-commanding current-mode control which controls the duration of a switching circuit on and off interval, respectively, responsive to the current flowing in the transformer primary winding and secondary winding, respectively. A feed-forward controller controls the duration of the switching circuit off and on interval, respectively, in response to the voltage provided by the secondary winding and D-C supply voltage, respectively. When using the valley-current-commanding current-mode controller, there may be a fixed duration of the switching circuit on interval.

9 Claims, 7 Drawing Sheets

FLYBACK CHARGING WITH CURRENT MODE CONTROLLED FLYBACK CONVERTER

This application is a continuation of Ser. No. 07/911,270, filed Jul. 7, 1992, now abandoned, and Ser. No. 07/667,462, filed Mar. 11, 1991, abandoned.

BACKGROUND OF THE INVENTION

The present invention relates generally to switching-mode dc/dc power converters, and more particularly to such power converters of the transformer-coupled flyback type which supply a train of current pulses to charge an energy-storage capacitor coupled to the transformer secondary winding via a diode. Each pulse in the train supplies part of the total charge delivered to the capacitor. Typical applications are to charge an energy-storage capacitor which supplies voltage to a load which subsequently discharges the capacitor. The power converter may thereafter recharge the capacitor if the load is a repetitive-discharging load. Examples of loads powered by an energy-storage capacitor are a xenon-filled flash lamp used as a photographic flash lamp, a stroboscopic light source, or a flashing light on an automotive vehicle such as a police vehicle or an emergency-service truck; an ignition/discharge system, such as a gas-ignition system; a cigarette lighter; a pulse-forming network for use in a pulsed radar transmitter; or a fuse in a military artillery shell.

A number of references preceded by bracketed numbers are listed below. These bracketed numbers appear in the description below to identify a correspondingly numbered reference pertinent to a portion in the description preceding the bracketed number.

The prior art includes hysteretic current-mode control. The transistor is turned "off" when the primary-winding current rises to the peak value given in equations (19) or (19a) below, and is turned "on" again when the transformer secondary-winding current falls to the fraction a of its initial value. This is a form of hysteretic current-mode control [4], [5]. The currents can be sensed using current-sensing resistors and/or current transformers.

U.S. Pat. No. 4,070,699 (issued Jan. 24, 1978 to Herbert M. Einbinder and assigned to Datascope Corp., Paramus, N.J.) describes a circuit which implements this control method by using current-sensing resistors in series with the transformer primary and secondary windings to sense the currents in those windings. The signals from the two current-sensing resistors are combined with relative weights corresponding to the transformer primary-to-secondary turns ratio. That combined signal is input to a trigger circuit which has two trigger values corresponding to maximum and minimum values of magnetic field strength for turning the switch "off" and "on" respectively.

U.S. Pat. No. 4,489,369 (issued Dec. 18, 1984, to Howard S. Ginsberg and assigned to the United States of America) discloses a method in which the secondary current falls to zero before the switch is turned "on" again; i.e., a is chosen as zero. This is done to ensure that all of the energy stored in the transformer is delivered to the capacitor, on each pulse. However, it nearly doubles the required peak current, increasing it by a factor of (1+a) as compared to the optimum method described here. The rms currents increase by slightly less than a factor of $\sqrt{(4/3)}$, and the $i^2R$ power losses (in the transistor, the transformer windings, the diode, the ESR of the energy-storage capacitor, and the resistance of the D.C. supply and/or its $V_{CC}$ bypass capacitor) increase by a factor of almost $4/3 = 1.33$.

U.S. Pat. No. 4,104,714 (issued Aug. 1, 1978, to Richard Hanley Smith and Peter Graham Laws, and assigned to Plessey Handel und Investments AG, of Zug, Switzerland) also requires the secondary current to fall to zero before the switch is turned "on" again, with the same increase of peak current and $i^2R$ power losses. One way they show to sense the termination of the secondary current is to sense the reversal of the diode voltage.

SUMMARY OF THE INVENTION

The invention comprises arrangements for optimum and almost-optimum charging of the capacitor. According to one aspect there is peak-current-commanding current-mode control with feed-forward-controlled "off" time. In lieu of sensing the transformer secondary current, the transistor is held "off" for a time determined by sensing the capacitor voltage and using the known relationship in equation (A-8) (in the Appendix below) between the capacitor voltage and the time required for the secondary current to fall to the fraction a of its initial value. This is a form of constant-"off"-time current-mode control [4], [5], in which the "off" time is controlled by a feed-forward controller which implements equation (A-8): the input variable is the capacitor voltage; the output variable is the duration of the "off" interval. (References [6] and [7] give examples of designs of feed-forward controllers for other applications.)

According to another aspect of the invention there is valley-current-commanding current-mode control with feed-forward-controlled transistor "on" time. In lieu of sensing the transformer primary current, the transistor is held "on" for the length of time known to be needed for causing the primary current to rise from $aI_{P(pk)}$ to $I_{P(pk)}$, derived at equation (A-7).

$$t_{on} = I_{P(pk)}(1-a)L/V_{CC}. \qquad (A-7)$$

The "off" time is determined by sensing the transformer secondary current and terminating the "off" interval when that current has fallen to a chosen value, nominally a times its initial value.

This is a form of constant-"on"-time current-mode control [4], [5], in which the "on" time is controlled by a feed-forward controller which implements equation (A-7), responsive to the actual value of $V_{CC}$ (not necessarily equal to the nominal value).

In this feed-forward controller, the input variable is the dc supply voltage; the output variable is the duration of the "on" interval.

Other features and advantages of the invention will become apparent from the following additional detailed description when read in connection with the accompanying drawings in which:

In valley-current-commanding current-mode control with fixed transistor "on" time, in lieu of sensing the transformer primary current, the transistor is held "on" for a fixed length of time, chosen as an approximation to the actual required value which varies with the dc supply voltage, for causing the primary current to rise from $aI_{P(pk)}$ to $I_{P(pk)}$, derived at equation (A-7) and repeated below for convenience:

$$t_{on} = I_{P(pk)}(1-a)L/V_{CC}. \tag{A-7}$$

The "off" time is determined by sensing the transformer secondary current and terminating the "off" interval when that current has fallen to a chosen value, nominally a times its initial value.

This is a form of constant-"on"-time current-mode control [4], [5], in which the "on" time is fixed at a compromise value which is suitable for a chosen set of values of L, $V_{CC}$, and $(1-a)I_{P(pk)}$.

Infeasibility of feed-forward control of both "on" and "off" times without current-sensing: The transistor "on" and "off" times cannot both be controlled by feed-forward as described above separately for the peak-current-commanding and valley-current-commanding control methods. Any inaccuracy in implementing either of the feed-forward controls could cause the increase of transformer primary current in each "on" interval to exceed (or be smaller than) n times the decrease of the transformer secondary current in the immediately preceding "off" interval. Then the peak primary current would increase (or decrease) in each cycle, potentially resulting in circuit destruction at excessively high current or malfunction at excessively low current.

Termination of the charging process: The charging process is terminated by inhibiting the transistor turn-on if the capacitor voltage is equal to or greater than the desired final value $V_{Cf}$, less the small voltage increase which is caused by delivering to the capacitor the last packet of energy, $kLI_{P(pk)}^2/2\ CV_{Cf}$.

The transformer coupling coefficient (k) is preferably as close to unity as practical.

A value of k less than unity results in a nonzero leakage inductance, $(1-k)L$. The leakage inductance causes a collector-voltage spike at transistor turn-off. The turn-off snubber and/or clamp circuit constrains the collector voltage to a peak value of $V_{CE(pk)}$, chosen to be safely below the maximum rated $BV_{CES}$ or $BV_{CEV}$. (Those voltage ratings apply, instead of $BV_{CEO}$, if the collector-voltage waveform is snubbed sufficiently by the turn-off snubber. A dissipative [1] or nondissipative [2], [3] snubber can be used.) The voltage clamp can be dissipative [8], [9] or can be of a type which returns the clamped energy to a power supply. Equations (1) and (2) below relate to single-pulse charging.

The peak collector voltage must be larger than the highest collector voltage which appears during diode conduction on the last pulse (when the voltage reflected from the charged capacitor to the collector is largest), by the factor $(1+\blacktriangle)$, i.e., $$V_{CE(pk)} = (1+\blacktriangle)(V_{CC}+V_{Cf}/n). \tag{3}$$

From (3), the overshoot-voltage parameter is $$\blacktriangle \equiv V_{CE(pk)}/(V_{CC}+V_{Cf}/n)-1. \tag{4}$$

$\blacktriangle$ must be greater than zero to allow the current in the transformer leakage inductance to decay after the transistor is turned "off," and hence to allow current to transfer from the primary to the secondary of the transformer. Increasing $\blacktriangle$ decreases the duration of the overshoot spike (coincident with the transfer of transformer current from the primary to the secondary, where it charges C); the duration of that spike is part of the transistor "off" interval.

The choice of $\blacktriangle$ is influenced by the value of the primary-to-secondary coupling coefficient (k) achieved in the transformer design. Together, k and $\blacktriangle$ determine the rise time of the secondary-current pulse (equal to the fall time of the primary-current pulse because the secondary current rises from zero to its peak value during the time that the primary current is falling from its peak value to zero). k less than unity, and the corresponding nonzero leakage inductance, cause a nonzero secondary-current rise time. The capacitor charging is effectively delayed by half of the secondary-current rise time (hence half of the primary-current fall time). The accumulation of those delay times during all of the pulses of the charging process adds a total delay of $T_R$ to the capacitor-charging time $T_C$. (The sum of $T_C$ and $T_R$ is the time $T_f$ to finish charging the capacitor.) The primary-current fall time is determined by k and $\blacktriangle$, and it increases from pulse to pulse during the charging process, as $v_C$ increases from its initial value of zero to its final value of $V_{Cf}$. Half of the primary-current fall time is $$t_{f(ip)}/2 = \frac{I_{P(pk)}(1-k)L}{2[V_{CE(pk)} - (V_{CC}+V_C/n)]} \tag{5}$$

The total delay can be approximated as the average of the longest and shortest charging-pulse delays, multiplied by the number of pulses in the charging process. The average of the longest and shortest delays is $$t_{avg} = I_{P(pk)}(1-k)L(\tfrac{1}{4})[1\ /(V_{CE(pk)}-V_{CC}-V_{Cf}/n)+1/(V_{CE(pk)}-V_{CC})]. \tag{6}$$

The number of pulses in the charging process is the final capacitor energy, divided by the energy transferred during each pulse:

$$N_{pulses} = [CV_{Cf}^2/2]/[KLI_{P(pk)}^2(1-a^2)/2] \tag{7}$$

Hence, $T_R$, the increase of capacitor-charging time attributed to the nonzero secondary-current rise time, is obtained by multiplying (6) by (7):

$$T_R = \frac{(1/k - 1)\ CV_{Cf}^2}{4 I_{P(pk)}(1-a^2)} \times \tag{8}$$

$$[1/(V_{CE(pk)} - V_{CC} - V_{Cf}/n) + 1/(V_{CE(pk)} - V_{CC})].$$

The time for the charging process $(T_C)$, derived in the Appendix, must be less than the specified final time $(T_f)$, by the amount $T_R$, given in equation (8) above.

The choice of $\blacktriangle$ depends on the value of k achieved in the transformer design. If k is unity, $T_R$ is zero, and $\blacktriangle$ can be chosen as zero. Given a nonunity value of k, $\blacktriangle$ must be nonzero, and $T_R$ is nonzero and a function of the value chosen for $\blacktriangle$: the larger the value of $\blacktriangle$, the smaller the resulting $T_R$. The smaller $T_R$ permits a larger value of $T_C$ and hence a smaller value of $I_{P(pk)}$. However, the larger value of ▲ requires a larger value of n, for a given set of the other parameters. That increases the value of $I_{P(pk)}$.

The optimum combination of ▲, n, and $V_{CC}$ minimizes $I_{P(pk)}$ for a given k, $V_{CE(pk)}$, C, $V_{Cf}$, $T_f$, and a. Alternatively, the optimum combination of ▲, n, and $V_{CE(pk)}$ minimizes $I_{P(pk)}$ for a given k, $V_{CC}$, C, $V_{Cf}$, $T_f$, and a.

The required peak current in the transistor and the transformer primary winding is $$I_{P(pk)} = (V_{Cf}^2/kV_{CC} + 2nV_{Cf})C/[T_C(1+a)]. \quad (9)$$

The Appendix below gives the derivation, ending at (A-11).

The durations of the transistor "on" and "off" intervals are directly proportional to the inductance L. To maintain high efficiency and to avoid undue dependence of performance on the transistor switching times, L is preferably chosen to yield transistor "on" and "off" intervals [$t_{on}$ in equation (A-7) and $t_{off}$ in equation (A-8)] which are much larger than the transistor switching times, e.g., of the order of 100 or more times the transistor current rise and fall times. The preferred value of L is the larger of $$L = t_{on} V_{CC}/[I_{P(pk)}(1-a)] \text{ or} \quad (10)$$

$$L = t_{off(min)}[V_{CE(pk)}/(1+▲) - V_{CC}]/(1-a)I_{P(pk)}. \quad (11)$$

$V_{CC}$, n, $V_{CE(pk)}$, and are constrained jointly by equation (3). Given a value for one of them, optimum values can be chosen for the other three. The expression for n is, from equation (3), $$n = V_{Cf}/[V_{CE(pk)}/(1+▲) - V_{CC}]. \quad (12)$$

Substituting equation (12) into equation (9) for $I_{P(pk)}$ yields an expression for $I_{P(pk)}$ in terms of $V_{Cf}$, $V_{CE(pk)}$, C, k, a, $T_C$, ▲, and $V_{CC}$. But $$T_C = T_f - T_R \quad (13)$$

where $T_R$ is given by equation (8). Accordingly, $I_{P(pk)}$ can then be expressed in terms of $V_{Cf}$, C, k, a, $T_f$, $V_{CE(pk)}$, ▲, and $V_{CC}$. Given the first six parameters, it is desirable to minimize $I_{P(pk)}$ by optimum choice of ▲ and $V_{CC}$. Alternatively, given $V_{CC}$ and the first five parameters, we can minimize $I_{P(pk)}$ by optimum choice of ▲ and $V_{CE(pk)}$.

For this purpose, set the partial derivatives of $I_{P(pk)}$ with respect to and $V_{CC}$ both equal to zero, and solve for ▲$_{(opt)}$ and $V_{CC(opt)}$. These, in turn, give $n_{(opt)}$ and $I_{P(pk)(opt)}$. The results are given in equations (14) through (19a) below.

Because $V_{CC(opt)}$ and $V_{CE(pk)}$ are linearly related by a constant X (given in equation (14) below) which is independent of the variables ▲, $V_{CC}$, and $V_{CE(pk)}$, the partial derivatives and the solutions for the optimum parameter values can be derived in the form of "given $V_{CE(pk)}$, find the optimum $V_{CC}$" and the solutions can be re-cast in the form of "given $V_{CC}$, find $V_{CE(pk)}$ for the optimum design," substituting the derived linear relationship equation (17) between the values of $V_{CC}$ and $V_{CE(pk)}$ in the optimum circuit.

For convenience, let $$X = \{2k + [2k(1+a)(1-k)]^{1/2} + (1+a)(1-k)/2\}^{1/2} \quad (14)$$

and $$Y = \{8k/[(1+a)(1-k)]\}^{1/2}. \quad (15)$$

(As k and a both approach the ideal values of 1, X approaches $\sqrt{2}$ and Y approaches infinity.)

Setting the partial derivatives to zero and solving for the optimum parameter values, $$▲_{(opt)} = X/[1 + Y(1+X)] \quad (16)$$

$$V_{CC(opt)} = V_{CE(pk)}/(1+X) \text{ if } V_{CE(pk)} \text{ is specified, or} \quad (17)$$

$$V_{CE(pk)(opt)} = V_{CC}(1+X) \text{ if } V_{CC} \text{ is specified} \quad (17a)$$

$$n_{(opt)} = (V_{Cf}/V_{CE(pk)})(1+1/Y)(1+1/X) \text{ if } V_{CE(pk)} \text{ is specified,} \quad (18)$$

or $$n_{(opt)} = (V_{Cf}/V_{CC})(1+1/Y)(1+1/X)(1+X) \text{ if } V_{CC} \text{ is specified} \quad (18a)$$

$$I_{P(pk)(opt)} = (CV_{Cf}^2/T_f V_{CE(pk)})(1+X)^2/[(1+a)k] \text{ if } V_{CE(pk)} \text{ is specified} \quad (19)$$

or $$I_{P(pk)(opt)} = (CV_{Cf}^2/T_f V_{CC})(1+X)/[(1+a)k] \text{ if } V_{CC} \text{ is specified.} \quad (19a)$$

In some applications, it might be desirable to choose values for n, $V_{CE(pk)}$, and ▲ for a circuit to operate over a specified range of $V_{CC}$. If n and ▲ are fixed (i.e., not changed as $V_{CC}$ changes), the chosen combination can be optimum (as derived above) at only one chosen value of $V_{CC}$. At other values of $V_{CC}$, the performance will be sub-optimum as compared with what could be obtained with a set of parameter values chosen to be optimum at the specific other value of $V_{CC}$. For this type of application, an exemplary design procedure is:

1. Choose ▲$_{(opt)}$ from equation (16), not a function of $V_{CC}$.
2. Choose n from equation (18a), using the minimum value of $V_{CC}$.
3. Choose $I_{P(pk)}$ from equation (19a), using again the minimum value of $V_{CC}$. Implicitly contained in equation (19a) is the assumption that the transformer will have $n_{(opt)}$ calculated from equation (18a) using the same value of $V_{CC}$ used in equation (19a) to calculate $I_{P(pk)}$. That assumption is met in this procedure.
4. Determine the required transistor $V_{CE(pk)}$ capability from equation (3), using the already determined values of ▲ and n and the maximum value of $V_{CC}$.

This circuit will be optimum at the minimum value of $V_{CC}$, and sub-optimum at higher voltages. If the optimum value of n were used at each higher value of $V_{CC}$, the needed value of $I_{P(pk)}$ would be inversely proportional to $V_{CC}$. But since n will be fixed, the ratio of $i_s/i_p = 1/n$ will not be increasing in proportion to $V_{CC}$. Therefore the value of $I_{P(pk)}$ cannot be reduced inversely with increasing $V_{CC}$ as might be supposed from a casual inspection of equation (19a).

Figure 1:
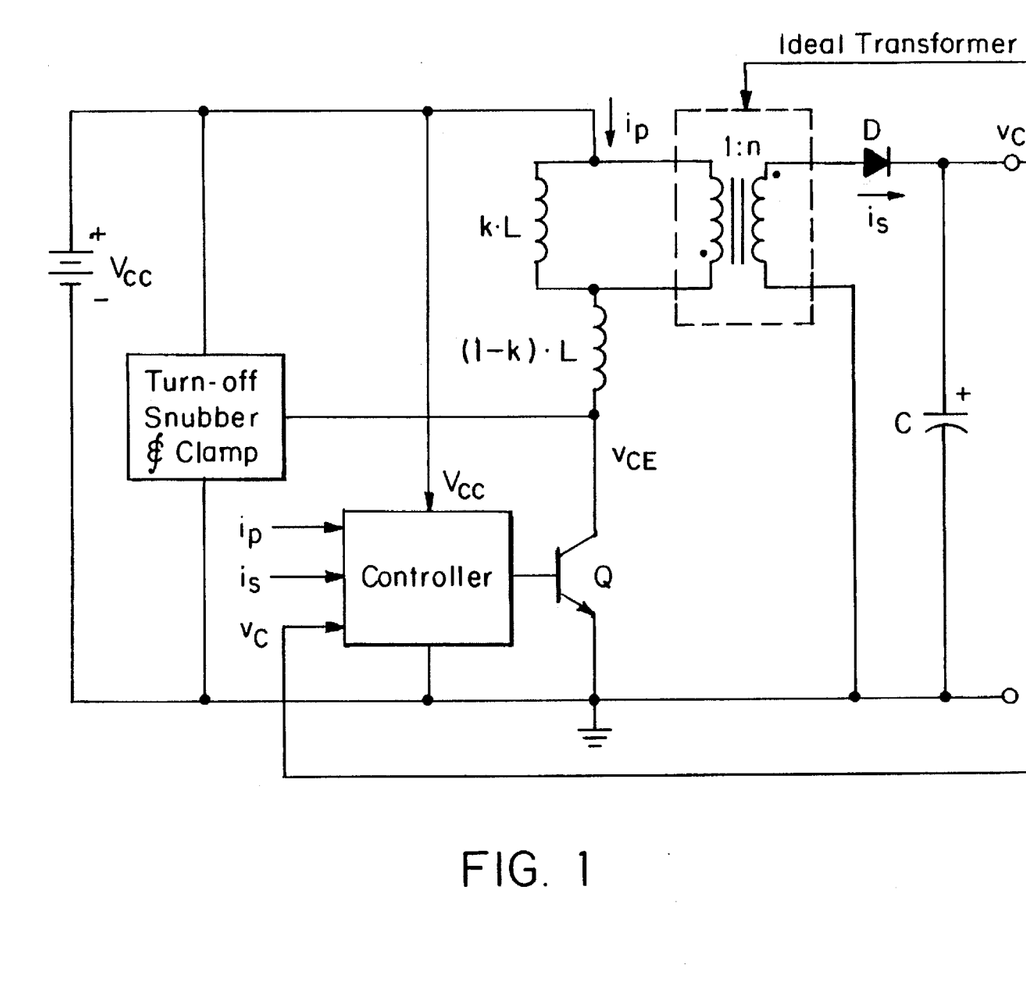
FIG. 1 is a schematic diagram of a flyback-type transformer-coupled dc/dc power converter used to charge an energy-storage capacitor.
Figure 2:
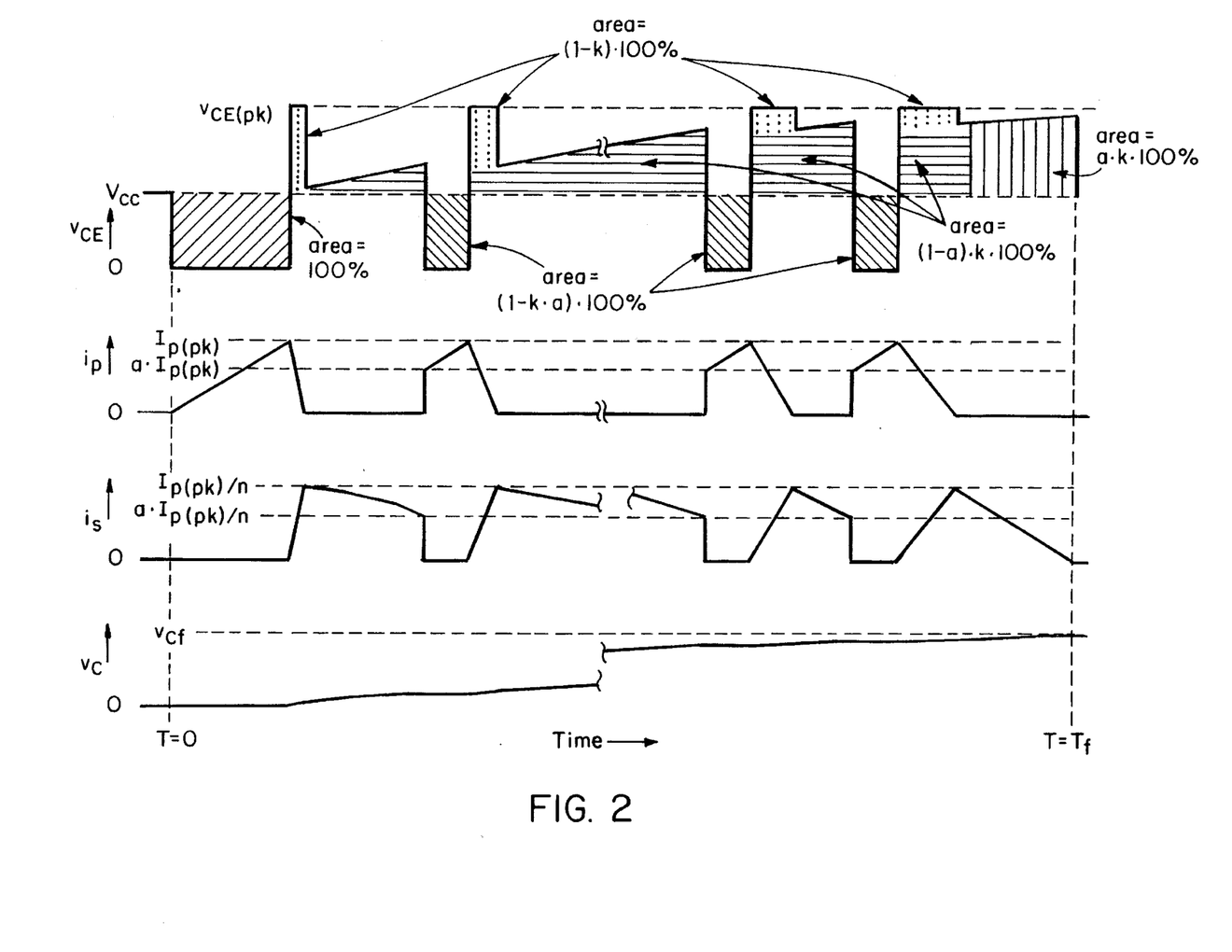
FIG. 2 shows the voltage and current waveforms during the charging process, at the power-transistor collector and at the energy-storage capacitor.

An energy-storage capacitor (e.g., for a flash-lamp) is usually charged from near-zero voltage to the desired final voltage in a flyback circuit like that shown in FIG. 1. The transistor Q is operated in the switching mode. FIG. 2 shows the circuit voltage and current waveforms. When the transistor is turned "off," the transformer current transfers from the primary winding to the secondary winding, flowing through the diode D and charging the energy-storage capacitor C. The capacitor is usually charged with a series of such pulses. During any one pulse in the series, the rate of decay of the charging-current pulse is proportional to the capacitor voltage at that time during the charging process. Because the capacitor voltage starts at near-zero voltage at the beginning of the charging process, and ends at the fully charged voltage, the rate of decay of the capacitor-charging current pulses varies over a wide range during the charging process. This causes difficulty for any charging method based on a constant pulse frequency. The frequency should begin at a low value, and increase monotonically during the charging process.

Optimum flyback-charging is defined as follows: a specified capacitance is charged to a specified voltage within a specified time, using a transistor with a specified peak-voltage capability, with the smallest possible peak and rms currents in the transistor, the transformer primary and secondary windings, and the dc power source. Alternatively, the specified capacitance is charged to the specified voltage within the specified time, using a specified dc supply voltage, again with the smallest possible peak and rms currents in the transistor, the transformer primary and secondary windings, and the dc power source. Minimizing the rms currents minimizes the power losses in the circuit resistances. Minimizing the peak currents minimizes the rms currents.

Depending on the timing requirements and the peak current permitted in the power transistor and the transformer windings, the charging can be done by one pulse or by a series of pulses. If the charging is done by a series of pulses (the usual method), a constant pulse frequency is not the optimum method of charging, even if the pulse width is varied during the charging. The optimum method uses a fixed transistor "on" time and an "off" time which varies in a specific way during the charging, as described herein.

Notation commonly used with bipolar junction transistors is used here; the same analysis applies to MOSFETs also. The following symbols are used:

| | |
|---|---|
| Transformer total primary inductance | $L$ |
| Transformer coupling coefficient (fraction of primary-winding magnetic flux which links secondary winding) | $k$ |
| Transformer leakage inductance, referred to primary | $(1-k)L$ |
| Transformer inductance in parallel with "ideal" transformer | $kL$ |
| Transformer secondary/primary turns ratio | $n$ |
| Transformer primary-winding current | $i_p$ |
| Transformer secondary-winding current | $i_s$ |
| Transformer primary-winding (and transistor) peak current | $I_{P(pk)}$ |
| Fraction of initial charging-current pulse to which the charging current has decreased at the time the "off" transistor is turned "on" | $a$ |
| Capacitor value | $C$ |
| Capacitor voltage during the charging process | $v_c$ |
| Required capacitor final voltage | $V_{Cf}$ |
| Total time allowed for charging capacitor from zero voltage to $V_{Cf}$ | $T_f$ |
| Time required for charging process in the absence of delays caused by nonzero rise time of capacitor-charging current pulses | $T_C$ |
| Time added to charging process by nonzero rise time of capacitor-charging current pulses | $T_R$ |
| Clamped $V_{CE(pk)}$ overshoot factor: the ratio of the $V_{CE(pk)}$ clamped voltage to the steady-state value of $V_{CE}$ in the "off" interval of the last capacitor-charging pulse is $(1+\blacktriangle)$ | $\blacktriangle$ |
| Dc input voltage | $V_{CC}$ |

If the charging is done by one pulse, the control method is to allow the transformer primary current to build up to a peak value $I_{P(pk)}$ such that the energy stored in the coupled portion of the primary inductance is equal to the energy to be stored in the capacitor at the desired final voltage $V_{Cf}$, plus parasitic power losses which are neglected here. Then $$I_{P(pk)(single\ pulse)}^2 kL/2 = CV_{Cf}^2/2. \quad (1)$$

Solving equation (1) for the current required to charge the capacitor in a single pulse yields $$I_{P(pk)(single\ pulse)} = V_{Cf}\sqrt{(C/kL)}. \quad (2)$$

If these values of transistor peak current or transformer stored energy (hence transformer volume) are too large, the capacitor can be charged by a series of pulses, each pulse delivering only a fraction of the total energy to be stored in the capacitor. In that case, the transistor is turned "on" for the amount of time needed for the transformer primary current to build up to a chosen value described below. When the transistor is turned "off," current transfers from the transformer primary winding to the secondary winding. The secondary winding begins to deliver, to the capacitor, energy which had been stored in the transformer inductance $kL$ and the current decreases approximately linearly with time, to the fraction $a$ of its initial value. When the transistor is turned "on" again, current flow in the secondary ceases and that winding ceases delivering energy to the capacitor. Because the "on" transistor applies the dc-input voltage across the primary winding, the current in the transformer primary winding increases linearly with time, starting at the fraction $a$ of its former peak value. The interval of increasing primary current prepares the circuit for the next transfer of energy to the capacitor.

Turning-on the transistor terminates the delivery of energy to the capacitor, so this might seem to be detrimental to completing the charging of the capacitor within a specified time. On the other hand, the longer the transistor is held "off," the longer it will take subsequently to replenish the energy in the primary winding, in preparation for the next pulse of delivering energy to the capacitor. This is because the transistor initial current will be lower, because the secondary current will have declined further during the longer "off" interval (the fraction $a$ will be smaller). This, too, could be detrimental to completing the charging of the capacitor within the specified time.

Important questions to be answered to determine the optimum method of charging are:

When should the transistor be turned "on" and "off," to charge the capacitor to a required voltage within a required time, while imposing the least possible current stress on the transistor, the transformer primary winding, and the dc-input power source?

What is the "best" choice for the dc power supply voltage $V_{CC}$, using a transistor with the capability to operate at a given peak voltage $V_{CE(pk)}$?

Alternatively, what transistor peak-voltage capability is required, using a given dc supply voltage $V_{CC}$?

What is the "best" choice for the transformer turns ratio?

What is the "best" choice for the transformer primary inductance?

What is the "best" choice for the overshoot-voltage parameter $\blacktriangle$?

The optimum charging approach is set forth above by analysis. However, physical reasoning provides a qualitative result directly, as follows.

FIG. 2 shows the waveform of the capacitor-charging current pulse (the secondary-winding current). Note that the current decreases approximately linearly with time during the pulse. The longer the pulse is allowed to continue, the lower becomes its average current, for a given peak value and a given rms value. The charge delivered to the capacitor during the pulse is directly proportional to the average current during the pulse. Therefore the lowest peak and rms currents, for delivering a specified amount of average current, are obtained by charging the capacitor with current pulses whose tops droop as little as possible, i.e., the pulses are as nearly flat-topped as possible. Therefore the best strategy is to terminate the secondary-winding current as soon as possible after it begins (by turning the transistor "on" again), resulting in a nearly flat-topped current pulse (of short duration) flowing into the capacitor. Then allow the primary-winding current to build up again to the chosen peak value and turn the transistor "off" to begin another capacitor-charging current pulse.

This approach uses short-duration capacitor-charging pulses, interlaced with short-duration pulses of transistor conduction to replenish the energy delivered from the transformer to the capacitor. The pulse repetition frequency is high because the pulses are short. A practical implementation is to make the pulses as short as possible within the limitations of the controller and the power stage:

The minimum pulse durations are preferably of the order of ten times as long as the inherent time delays in the controller's response to its inputs, so that the controller can operate accurately.

To maintain good efficiency in the power stage, the minimum transistor "on" duration is preferably of the order of 100 times the transistor current fall time. This multiplication factor depends on the effectiveness of the turn-off and turn-on snubbers [1], [2], [3] used in the power circuit. The transformer leakage inductance provides turn-on snubbing, but causes power dissipation at turn-off unless a "lossless" turn-off snubber is used. The transistor "on" and "off" intervals are preferably long compared with the diode forward and reverse recovery times.

The result of applying these considerations is a nearly flat-topped capacitor-charging current pulse. The current at the end of the pulse will be the fraction a of its initial value, where a is less than unity. The average/peak ratio of the current pulse is slightly larger than (1+a)/2. For example, a pulse which ends with 80% of the initial current achieves slightly more than 90% of the average/peak ratio which would, in principle, be obtained from a circuit operating at infinite frequency with zero-duration pulses.

Thus, the optimum charging method is as follows:

1. Turn the transistor "on" long enough to build up the transformer primary-winding current to a peak value $I_{P(pk)(opt)}$, derived herein and given in equations (19) and (19a).
2. Turn the transistor "off" long enough for the secondary-winding current to fall to a fraction a of its initial value of $I_{P(pk)}/n$, where a and n are chosen as described below. (The amount of time required for the current to fall to the fraction a of its initial value decreases as the voltage on C builds up, pulse by pulse, from zero to the final value. As a result, the transistor "off" time decreases, and the switching frequency increases, as the capacitor charges. This is because di/dt in the magnetizing inductance, proportional to the reflected secondary voltage, is larger when the capacitor voltage is larger.)
3. Then turn the transistor "on" again.
4. The cycle is repeated until the capacitor reaches the desired final voltage. After that, the transistor is held "off" and the capacitor remains charged, at the final voltage.
5. The capacitor voltage might decay slowly during the time until the load discharges the capacitor, because of leakage current in the capacitor, the diode, or the load. If the decay can be appreciable, the controller can be arranged to cause the power transistor to deliver a pulse of charge to the capacitor to replace the charge lost by leakage, after the capacitor-voltage sensor has indicated that the voltage has decayed by a chosen amount.
6. After the capacitor is discharged by the load (e.g., a gas-filled flash lamp), it might be necessary to prevent the transistor from being turned "on" again, for the time needed for the load to return to its normal "off" state (the state it normally is in during the capacitor charging), e.g., the time needed for the gas in a flash lamp to deionize.

The time needed for the transistor current to build up from zero to $I_{P(pk)}$, during the first charging pulse, is $LI_{P(pk)}/V_{CC}$. If that time is not long enough for the load to return to its normal "off" state, a delay can be added between the discharging of the capacitor and the beginning of the recharging process.

The parameter a is preferably as close to unity as practical, consistent with other tradeoff factors involving the controller response time and the increasing power dissipation in the power stage which accompanies increased switching frequency.

Equation (19a) shows that the optimum value of $I_{P(pk)}$ is inversely proportional to the value of $V_{CC}$. In designing any type of charger controller, the designer may use a fixed value of $I_{P(pk)}$ which is sufficient for meeting the charging-time requirement at the lowest value of $V_{CC}$, or make $I_{P(pk)}$ be a decreasing function of $V_{CC}$.

The result of implementing the first choice is that the capacitor will be charged within the required time when $V_{CC}$ is at the minimum value, and will be charged more quickly than needed when $V_{CC}$ exceeds the minimum value. The penalty associated with the faster-than-needed charging is that the power dissipation in the circuit resistances will be larger than it would have been if the value of $I_{P(pk)}$ had been reduced when $V_{CC}$ exceeds the minimum value, in accordance with the known need for lower values of peak current.

The result of implementing the second choice will be a more-complex controller, but lower power dissipation and higher efficiency when $V_{CC}$ exceeds the minimum value.

The choice depends on the trade-off factors applicable in a given application.

Figure 3:
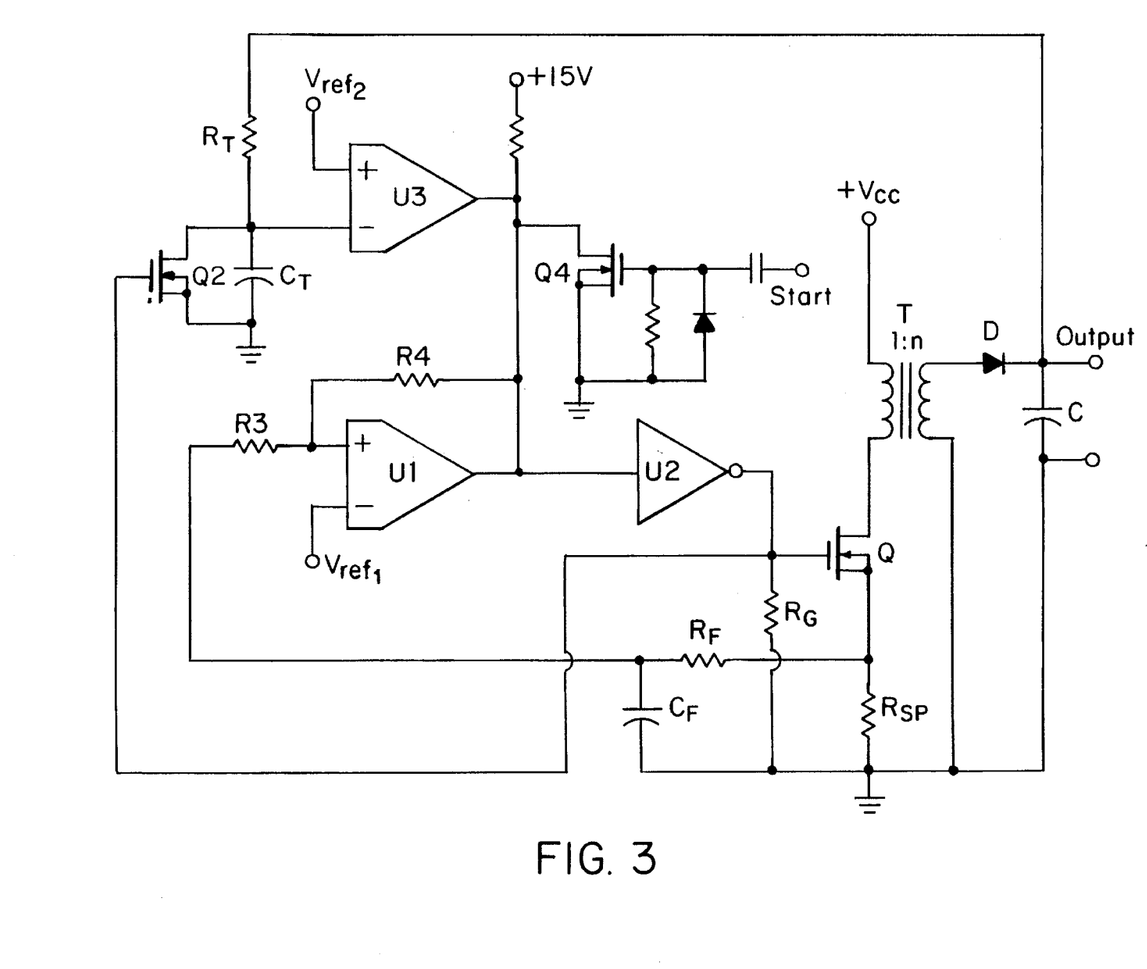
FIG. 3 shows a controller which implements peak-current-commanding current-mode control of the transistor "on" time and feed-forward control of the transistor "off" time.

FIG. 3 shows a controller which gives peak-current-commanding current-mode control of the transistor "on" time and feed-forward-control of the "off" time. The feed-forward control is responsive to the capacitor voltage ($v_C$).

Control of transistor "on" time and peak current: The peak current in transistor Q is controlled by conventional peak-current-commanding current-mode control [4], [5], to have the desired value $I_{P(pk)}$, e.g., the optimum value given by equations (19) or (19a). To follow the circuit operation, assume that the converter has been generating a train of pulses, and that transistor Q is "on," conducting a current less than $I_{P(pk)}$. The voltage at the non-inverting input of comparator U1 is lower than the reference voltage $V_{ref1}$, so the output of comparator U1 is at ground. The output of gate-driver U2 is positive, and transistors Q and Q2 are "on." Because transistor Q2 is "on," the voltage on timing capacitor $C_T$ is at ground. As a result, the output (pull-down) transistor of comparator U3 is "off," but the comparator U3 output is at ground because it is being held there by the pull-down output of comparator U1. Current-sensing resistor $R_{sp}$ provides a signal voltage $i_p R_{sp}$ proportional to the primary-winding current (the resistance of resistor $R_{sp}$ is much smaller than the resistances of resistors $R_F$, R3, and R4). Spurious noise spikes in the signal are reduced by the low-pass filter comprising resistor $R_F$ and capacitor $C_F$; the time constant $R_F C_F$ is longer than the spike duration, but shorter than the transistor "on" time. The current-sense signal becomes $i_p R_{sp} R4/(R3+R_F+R4)$ at the non-inverting input of comparator U1. Until that voltage reaches $V_{ref1}$, the circuit remains in the "on" state, and ip continues to increase. When the increasing $i_p$ reaches the value $I_{P(pk)}$, the voltage $i_p R_{sp} R4/(R3 +R_F+R4)$ reaches the value $V_{ref1}$ and comparator U1 output switches from ground to positive. The positive feedback around comparator U1 (via resistor R4) latches comparator U1 output positive. Gate Driver U2 output drops to ground, turning off transistor Q and Q2.

control of transistor "off" time, responsive to voltage on capacitor C: The transistor "off" time is made inversely proportional to the voltage on capacitor C by a timing generator which is responsive to the voltage on capacitor C. When transistor Q2 turns off at the end of the transistor "on" interval, it releases the timing capacitor $C_T$. Current from the timing resistor $R_T$ begins charging capacitor $C_T$ positive, at a rate proportional to the difference between the voltage on capacitor C ($v_C$) and the voltage on capacitor $C_T$. If the reference voltage $V_{ref2}$ and the voltage on capacitor $C_T$ are small compared with the voltage $v_C$, the time for the capacitor $C_T$ voltage to reach the voltage $V_{ref2}$ is accurately inversely proportional to $v_C$ (e.g., if $V_{ref2} \leq 2\ v_C$, the accuracy is better than ±2.5%). When the capacitor $C_T$ voltage reaches $V_{ref2}$, the comparator U3 output switches from positive to ground, terminating the transistor "off" interval. The output of comparator U1 switches from ground to positive, turning transistors Q and Q2 "on." Positive feedback around comparator U1 latches the comparator U1 output at ground, maintaining the "on" state of transistor Q. Transistor Q2 discharges capacitor $C_T$ to ground, preparing the timing generator for the next cycle of operation. The circuit is now in the state it had at the beginning of this description. The cycle described here continues to repeat until the charging process is terminated by the action of an auxiliary circuit (not shown in FIG. 3) which detects the fact that the capacitor voltage $v_C$ has reached the desired final value.

The charging process is initiated by a positive trigger applied to the START input. That turns on transistor Q4, pulling the comparator U1 output node to ground. Comparator U1 latches as described previously, and transistor Q remains "on" until $i_p$ reaches $I_{P(pk)}$ as described above. Then the charging process continues as described above.

Figure 4:
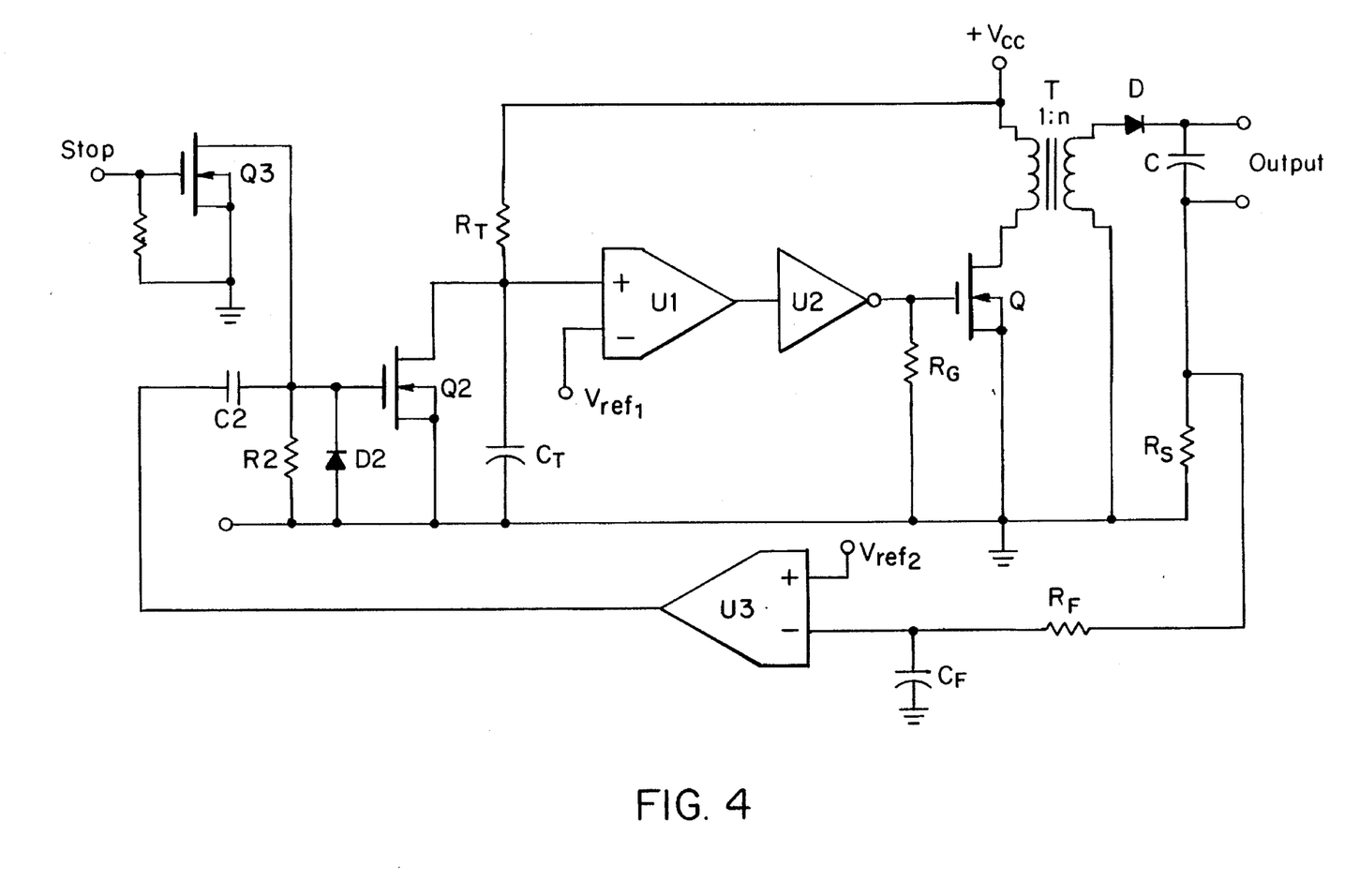
FIG. 4 shows a controller which implements valley-current-commanding current-mode control of the transistor "off" time and feed-forward control of the transistor "on" time.

FIG. 4 shows a valley-current-commanding current-mode control which controls the transistor "off" time, with feed-forward-control of the transistor "on" time, responsive to voltage $V_{CC}$, intended to keep the increase of primary current independent of $V_{CC}$.

The charging process is initiated by an auxiliary circuit not shown in FIG. 4. To follow the circuit operation, assume that the circuit has been generating a train of pulses, and the circuit is in the following state of the charging cycle: the falling secondary current has just reached the threshold value $V_{ref2}/R_s$, the comparator U3 output has just switched positive, and transistor Q2 has just turned "on" for a short time determined by the time constant $R_2 C_2$ of the differentiator comprising resistor $R_2$ and capacitor $C_2$, discharging the timing capacitor $C_T$ to zero from its previous voltage of higher than $V_{ref1}$, and then releasing capacitor $C_T$ a short time later. When the capacitor $C_T$ voltage had been higher than reference voltage $V_{ref1}$, comparator U1 output had been positive, gate driver U2 output had been at zero, and transistor Q had been "off." When the capacitor $C_T$ voltage is pulled below $V_{ref1}$ by the "on" transistor Q2, comparator U1 output switches to zero, gate driver U2 output switches positive, and transistor Q turns "on." Because transistor Q2 is "on" for only a short time, it soon releases capacitor $C_T$, which then begins charging toward $V_{CC}$ via the timing resistor $R_T$. Capacitor $C_T$ charges at a rate which is proportional to $V_{CC}$, causing the duration of the timing waveform on capacitor $C_T$ (the "on" time of transistor Q) to be inversely proportional to $V_{CC}$, as desired. After a time $R_T C_T \ln[1-(V_{ref1}/V_{CC})]$, the timing-junction voltage reaches the threshold value $V_{ref1}$. Then the comparator U1 output switches positive and the U2 output switches to ground, turning transistor Q "off." At this time, the current in transistor Q and the transformer primary had reached the value $V_{CC} R_T C_T \ln[1-(V_{ref1}/V_{CC})]/L$. Current transfers from the primary of transformer T to the secondary, resulting in a secondary current whose initial value is $V_{CC} R_T C_T \ln[1-(V_{ref1}/V_{CC}00)]/Ln$, and an initial voltage on the current-sensing resistor of $R_s V_{CC} R_T C_T \ln[1-(V_{ref1}/V_{CC})]/Ln$. That voltage exceeds $V_{ref2}$, so the comparator U3 output switches from positive to ground. That negative-going transition drives the already-off transistor Q2 further "off," so no action results. When the secondary current falls to the value $V_{ref2}/R_s$, the comparator U3 output switches positive, again turning transistor Q2 "on" for a short time (determined by the values of capacitor C2 and resistor R2), which discharges capacitor $C_T$ to zero and then releases capacitor $C_T$ shortly thereafter. The cycle continues repeating as already explained until a separate circuit (not shown in FIG. 4) detects that the voltage on capacitor C has reached the desired value and terminates the procedure by applying a positive voltage to the STOP input. That holds transistor Q2 "off" and allows the timing junction to go positive and hold the transistor Q gate "off" at ground.

This operation meets the desired control requirements:

The increase of primary current during the "on" time of transistor Q is $V_{CC} R_T C_T \ln[1-(V_{ref1}/V_{CC})]/L$. If $V_{ref1}/V_{CC}$ is small, the ln term is approximately $[V_{ref1}/V_{CC}-(V_{ref1}/V_{CC})^2/2]$, so the increase of primary current is approximately $R_T C_T V_{ref1}[1-(V_{ref1}/V_{CC})/2]/L$. This is nearly independent of $V_{CC}$; e.g., if $V_{ref1}/V_{CC} \leq 0.2$, a variation of $V_{CC}$ over a range as large as 2:1 will cause less than a ±2.5% change in the increase of primary current during the transistor "on" time. Thus the increase of transformer primary current during the "on" time of transistor Q is essentially independent of $V_{CC}$, as desired.

The transistor "off" time is terminated when the transformer secondary current falls to $V_{ref2}/R_s$. The desired value of $I_{P(pk)}$ will be achieved if $V_{ref2}$ and $R_s$ are chosen such that $V_{ref2}/R_s = a I_{P(pk)}/n$.

Figure 5:
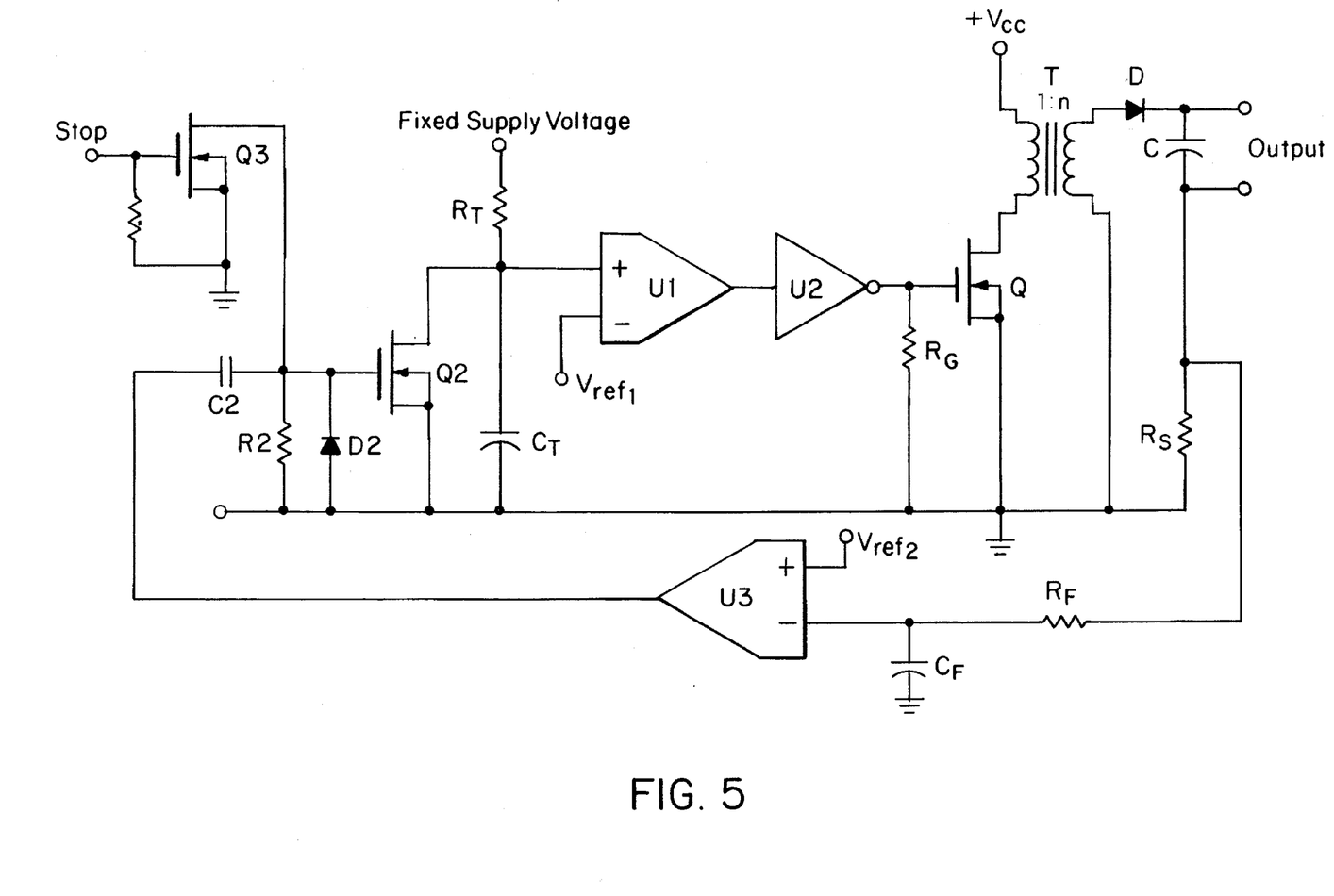
FIG. 5 shows a controller which implements valley-current-commanding current-mode control of the transistor "off" time and fixed transistor "on" time.

FIG. 5 shows a valley-current-commanding current-mode control with fixed transistor "on" time. This is the same as the controller described just above, except that the feed-forward control of the transistor "on" time is omitted. This controller provides optimum control at one chosen value of $V_{CC}$, and almost-optimum control at other values of $V_{CC}$. The benefit of this method is reduced circuit complexity. The penalty is lower efficiency at values of $V_{CC}$ other than the value for which the fixed "on" time is the optimum value. The lower efficiency occurs at these other values of $V_{CC}$ because the increase of transformer primary current during the transistor "on" time will no longer be independent of $V_{CC}$ as it was in the controller using feed-forward control of the transistor "on" time.

Figure 6:
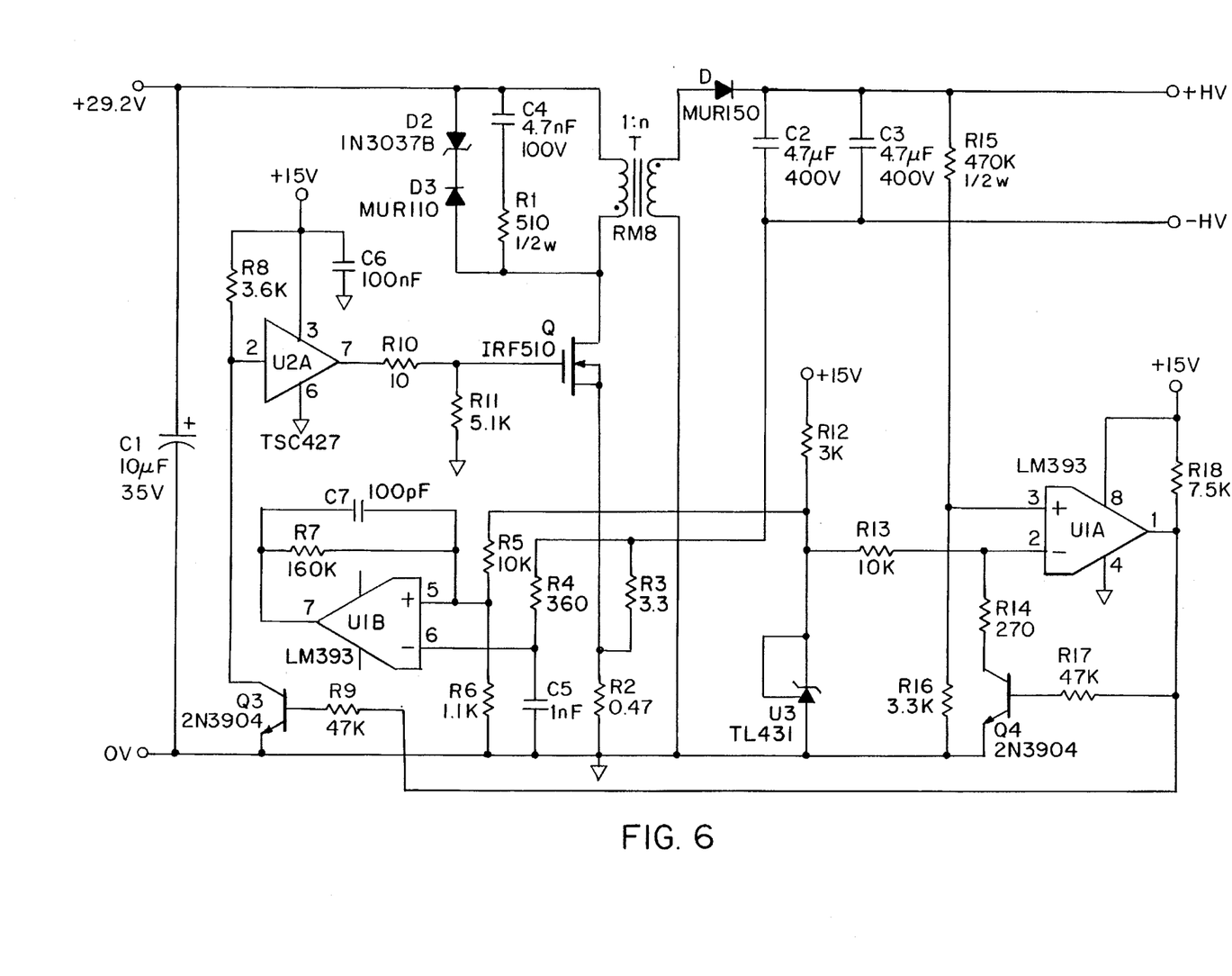
FIG. 6 shows a controller which implements hysteretic current-mode control: peak-current-commanding of the transistor "on" time, and valley-current-commanding of the transistor "off" time.
Figure 7A:
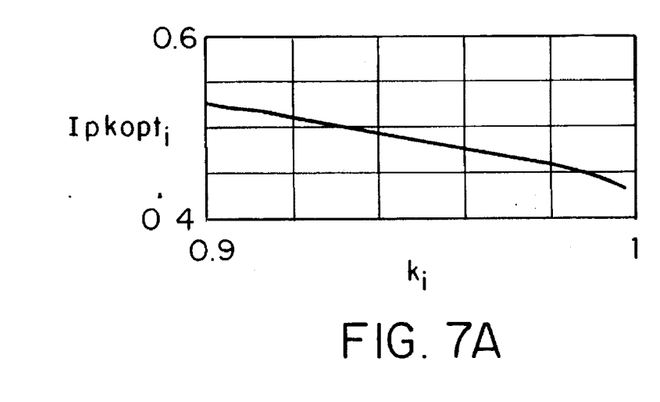
FIG. 7 shows variation of the values of design parameters with variations in the transformer coupling coefficient k.
Figure 7B:
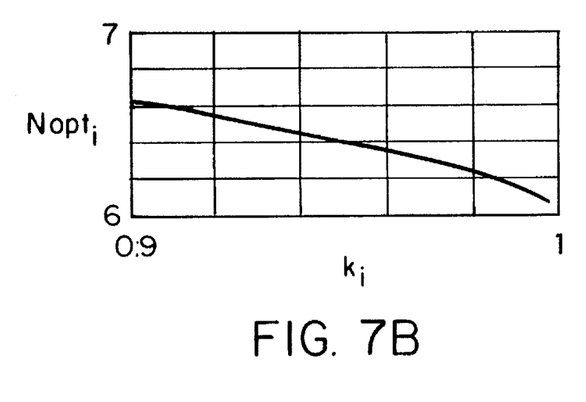
Figure 7C:
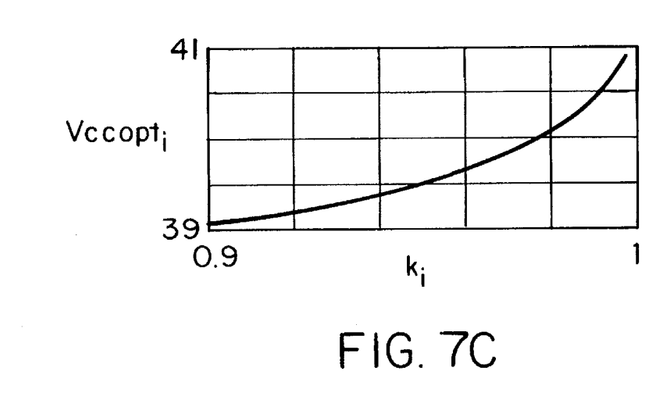
Figure 7D:
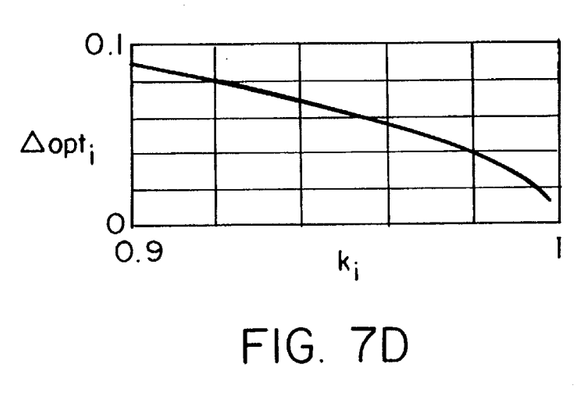

FIG. 6 shows a controller which implements hysteretic current-mode control. The transistor "on" time is controlled by peak-current-commanding control of the current in the transistor and the transformer primary winding. The transistor "off" time is controlled by valley-current-commanding control of the capacitor-charging current in the capacitor and the secondary winding.

Resistors R2 and R3 perform (1) current sensing in the transformer primary and secondary windings (providing voltage signals proportional to the currents in the windings), (2) relative scaling of the signals from the two windings so that both signals have the same scale factor of signal volts per ampere-turn of transformer excitation and (3) signal combining to combine the primary and secondary currents (which occur at different times) into a single signal, continuous in time, which represents the ampere-turns of transformer excitation throughout the cycle during both the energy-storing and energy-delivery parts of the cycle (when the transistor is "on" and "off" respectively. To perform the scaling function, the values of resistors R2 and R3 are chosen so that (R3+R2)/R2=n. The combined current signal is developed at the top of resistor R3.

Resistor R4 and capacitor C5 form a low-pass filter that filters noise from the signal and has a time constant longer than the duration of each noise spike and shorter than the transistor "on" and "off" times. This filtered signal energizes the input of hysteretic comparator U1B. The positive feedback gain of this comparator is chosen so that the two trigger levels of the hysteretic transfer function have the ratio of a, to implement the desired almost-flat-topped pulse shapes. The absolute value of the upper trigger level is set at the desired value of $I_{P(pk)}$, e.g., the value obtained from equations (19) or (19a).

The output of comparator U1B switches between its two states as the combined current signal reaches the values $I_{P(pk)}$ in the primary and $aI_{P(pk)}/n$ in the secondary. The output of comparator U1B drives the gate driver IC U2A, which in turn, drives transistor Q "on" and "off" at the desired times.

FIG. 6 shows the auxiliary circuit for terminating the charging process mentioned above as being omitted from FIGS. 3–5. Resistors R15 and R16 comprise a voltage divider whose output is a fraction of the capacitor voltage: $v_c R16/(R15+R16)$. This output voltage is compared with a reference voltage from voltage reference U3. When the sample of the voltage $v_c$ exceeds the reference voltage, comparator U1A output goes positive, which turns on transistor Q3, which forces the input of comparator U2A to ground to hold transistor Q "off" and terminate the capacitor-charging process.

It is considered good engineering practice to provide at least a small amount of positive feedback in all applications of comparators to avoid parasitic high-frequency oscillation which can occur when the comparator input signal is in the narrow part of the range where the comparator transfer characteristic is in a high-gain transition portion between the two saturated output states. This oscillation is a parasitic side effect caused by departures from ideality in the comparators and the physical layout of the circuit assemblies using them.

To make clear whether the function of a comparator in FIGS. 3–6 requires a single-valued or a hysteretic transfer characteristic, the positive feedback is shown explicitly only where a hysteretic characteristic is desired, it being understood that small positive feedback is used elsewhere to overcome the parasitic side effect in actual circuit construction. The connection for this small positive feedback is omitted in the drawings for clarity.

FIG. 7 shows the relationship between optimum design parameters and the coefficient of coupling k, for k between 0.900 and 0.998.

APPENDIX

This Appendix gives a detailed derivation of the mathematical relationships among $I_{P(pk)}$ and the other circuit variables.

The circuit brings the capacitor to its final voltage $V_{Cf}$ at the final time $T_f$. That time comprises two components:

$T_C$, the time which would be required for the charging if the current pulses in the transformer primary and secondary windings would have zero rise and fall times. That condition would be approached if the transformer leakage inductance would be negligibly small ($k \approx 1$).

$T_R$, the additional time required because of the nonzero rise and fall times of the current pulses. This Appendix gives the derivation of the relationship between $I_{P(pk)}$ and $T_C$. An expression for $T_R$ is derived in the main text, resulting in equation (8). $T_C$, $T_R$, and $I_{P(pk)}$ are combined at equation (13) et seq.

The relationship between the transformer primary peak current ($I_{P(pk)}$) and the capacitor-charging time ($T_C$) is found by deriving difference equations (the discrete analog of differential equations) which describe the duration of a cycle of a transistor "on" interval and "off" interval, considered to be a discrete element of time, $\Delta T$, which can be summed (analogous to integration of a continuous variable in a differential equation) from time zero (the start of the charging process) to time $T_C$ (the end of the charging process)

the change of capacitor voltage in one cycle ($\Delta v_C$), considered to be a discrete element of voltage change which can be summed from zero voltage (the start of the charging process) to the final voltage $V_{Cf}$ (the end of the charging process). In this analysis, the symbol $v_C$ represents the capacitor voltage at the beginning of each transistor "off" interval, during the charging process.

Similarly, the symbol T denotes time, which changes in increments of $\Delta T$ as described above. T represents the time at the beginning of each transistor "on" pulse, during the charging process. The beginning of the first "on" pulse is at T=0; the end of the charging process is at T=$T_C$.

When the transistor is turned "on" and "off" as described above in connection with FIG. 2, each pulse transfers stored energy from the transformer to the capacitor, of amount $$W_{pulse} = kLI^2_{P(pk)}/2 - kL(aI_{P(pk)})^2/2 \quad \text{(A-1)}$$
$$= kLI^2_{P(pk)}(1 - a^2)/2. \quad \text{(A-2)}$$

This increase of capacitor stored energy results in an increase of capacitor voltage $\Delta v_C$, which depends on the value of $v_C$ before adding the energy. $\Delta v_C$ is found by equating (a) the energy delivered by the transformer to the capacitor and (b) the difference between the energy stored in the capacitor at the voltage $v_C$ and at the voltage ($v_C + \Delta v_C$). Energy (a) is given in (A-2). Energy (b) is found as follows:

$$W_{pulse} = C(v_C + \Delta v_C)^2/2 - Cv_C^2/2 \quad \text{(A-3)}$$
$$= Cv_C \Delta v_C (1 + \Delta v_C/2v_C) \quad \text{(A-4)}$$
$$\approx Cv_C \Delta v_C. \quad \text{(A-5)}$$

Equating equations (A-5) and (A-2) yields the difference equation for $\Delta v_C$:

$$v_C \Delta v_C = kLI_{P(pk)}^2(1-a^2)/2C \quad \text{(A-6)}$$

To derive the difference equation for $\Delta T$, assume that the voltage drop in the total resistance in the primary circuit is much smaller than $V_{CC}$. Then the primary-winding current increases linearly with time while the transistor is "on," and the "on" time is $$t_{on} = I_{P(pk)}(1-a)L/V_{CC}. \qquad \text{(A-7)}$$

Assuming that the fall of transformer secondary current is approximately linear with time (as happens after the first few pulses, when $v_C$ is substantially larger than $\Delta v_C$), the "off" time is $$t_{off} \approx I_{P(pk)}(1-a)kL/(v_C/n). \qquad \text{(A-8)}$$

Assuming that the current rise and fall times (during the transfers of current between the windings) are small in comparison with the duration of a cycle ($t_{on}+t_{off}$), the duration of a cycle is the sum of (A-7) and (A-8). That is the discrete element of time, $\Delta T$:

$$\begin{aligned}\Delta T &= (t_{on} + t_{off}) \\ &\approx I_{P(pk)} (1-a) L [1/V_{CC} + kn/v_C].\end{aligned} \qquad \text{(A-9)}$$

Cross-multiplying (A-9) and (A-6) yields $$\Delta T k L I_{P(pk)}^2(1-a^2)/2C = v_C \Delta v_C I_{P(pk)}(1-a)L[1/V_{CC} + kn/v_C]. \qquad \text{(A-10)}$$

Integrating the left side of the equation on the differential $\Delta T$ from T=zero (start) to T=$T_C$ (end of the charging process), and integrating the right side of the equation on the differential $\Delta v_C$ from $v_C$=zero (start) to $v_C$=$V_{Cf}$ (final voltage at the end of the charging process), and solving for $I_{P(pk)}$ yields $$I_{P(pk)} = (V_{Cf}^2/V_{CC} + 2nkV_{Cf})C/[kT_C(1+a)]. \qquad \text{(A-11)}$$

REFERENCES

[1] M. Domb and N. O. Sokal, "R-C-diode turn-off snubber: peak $V_{CE}$, snubber and transistor power dissipation, and optimum design, for use in transformer-coupled power converters having non-negligible transformer leakage inductance," Power Conversion & Intelligent Motion, vol 11, no. 9, pp. 34, 36, 38, October 1985.

[2] M. Domb, R. Redl, and N. O. Sokal, "Nondissipative turn-off snubber alleviates switching power dissipation, second-breakdown stress, and $V_{CE}$ overshoot: analysis, design procedure, and experimental verification," IEEE Power Electronics Specialists Conference PESC '82 Record, IEEE Catalog No. 82CH-1762-4, pp. 445–454.

[3] A. Ferraro, "An overview of low-loss snubber technology for transistor converters," IEEE Power Electronics Specialists Conference PESC '82 Record, IEEE Catalog No. 82CH-1762-4, pp. 466–477.

[4] R. Redl and N. O. Sokal, "Current-mode control, five different types, used with the three basic classes of power converters: small-signal ac and large-signal dc characterization, stability requirements, and implementation of practical circuits," PESC '85 Record [of] 16th Annual IEEE Power Electronics Specialists Conference, IEEE Catalog No. 85CH-2117-0, pp. 771–785.

[5] R. Redl and N. O. Sokal, "What a design engineer should know about current-mode control," Proceedings [of] the Power Electronics Design Conference, October 1985, pp. 18– 33; distributed by Western Periodicals Co., 13000 Raymer St., North Hollywood, Calif. 91605.

[6] N. O. Sokal, "Feed-forward control for switching-mode power converters—a design example," Proceedings of POWERCON 3, vol. 3, pp. E2-1–E2-11, June 1976.

[7] R. Redl and N. O. Sokal, "Frequency stabilization and synchronization of free-running current-mode-controlled converters, IEEE Power Electronics Specialists Conference PESC '86 Record, IEEE Catalog No. 86CH2310 -1, pp. 519–530.

[8] M. Domb and N. O. Sokal, "Zener or extra winding copes with leakage inductance," Electronic Design, vol 29, no. 9, pp. 159–161, Apr. 30, 1981.

[9] S. Clemente and B. Pelly, "A universal 100 kHz power supply using a single HEXFET," International Rectifier Application Note AN-939A.

What is claimed is:

1. A flyback charger for charging an energy-storage capacitor to a predetermined voltage within a predetermined time interval from an energy source providing source voltage, apparatus comprising, a flyback transformer having at least a primary winding receiving said source voltage and a secondary winding, a controller for causing the energy-storage pulses of current in the transformer primary winding and the energy-delivery pulses of current in the transformer secondary winding to be nearly flat-topped, said controller comprising, a switching circuit connected to the primary winding, a limit-current-commanding current-mode controller that controls the switching of the switching circuit between the on and off conditions delivering and interrupting respectively current to the transformer primary winding in response to the current flowing in at least one transformer winding to provide a sequence of short-duration nearly flat-topped current pulses to the primary winding interlaced with a sequence of short-duration nearly flat-topped delivery pulses from the secondary winding of prescribed amplitude to provide charge for charging said energy-storage capacitor to said predetermined voltage within said predetermined time interval from said energy source, wherein said limit-current-commanding current-mode controller is a valley-current-commanding-mode controller which controls the duration of the switching circuit off interval in response to the current in the secondary winding, and further comprising a timing circuit characterized by circuit components with parameter values that establish a fixed duration for the switching circuit on interval.

2. A flyback charger in accordance with claim 1 and further comprising, an energy-storage capacitor, and a unilaterally conducting device connecting the transformer secondary winding to the energy-storage capacitor.

3. A flyback charger for charging an energy-storage capacitor to a predetermined voltage within a predetermined time interval from an energy source providing source voltage, apparatus comprising, a flyback transformer having at least a primary winding receiving said source voltage and a secondary winding, a controller for causing the energy-storage pulses of current in the transformer primary winding and the energy-delivery pulses of current in the transformer secondary winding to be nearly flat-topped, said controller comprising, a switching circuit connected to the primary winding, a limit-current-commanding current-mode controller that controls the switching of the switching circuit between the on and off conditions delivering and interrupting respectively current to the transformer primary winding in response to the current flowing in at least one transformer winding to provide a sequence of short-duration nearly flat-topped current pulses to the primary winding interlaced with a sequence of short-duration nearly flat-topped delivery pulses from the secondary winding of prescribed amplitude to provide charge for charging said energy-storage capacitor to said predetermined voltage within said predetermined time interval from said energy source, an energy-storage capacitor, and a unilaterally conducting device connecting the transformer secondary winding to the energy-storage capacitor, wherein the duration of the switching circuit being on is sufficient to build up the transformer primary winding current to a peak value $I_{P(pk)(opt)}$ according to the relationship established by an equation from the group consisting of equations $I_{P(pk)(opt)} = (CV_{Cf}^2/T_f V_{CE(pk)})(1+X)^2/[(1+a)k]$ if $V_{CE(pk)}$ is specified, and $I_{P(pk)(opt)} = (CV_{Cf}^2/T_f V_{CC})(1+X)/[(1+a)k]$ if $V_{CC}$ is specified.

4. A flyback charger in accordance with claim 3 wherein the switching circuit is off for an off duration sufficient to allow the current in the secondary winding to fall to a fraction a of its initial value of $I_{P(pk)}/n$ where a is slightly less than one and n is defined by equation $n=(V_{Cf}/V_{CC})(1+1/Y)(1+1/X)/(1+X)$ if $V_{CC}$ is specified.

5. A flyback charger for charging an energy-storage capacitor to a predetermined voltage within a predetermined time interval from an energy source providing source voltage, apparatus comprising, a flyback transformer having at least a primary winding receiving said source voltage and a secondary winding, a controller for causing the energy-storage pulses of current in the transformer primary winding and the energy-delivery pulses of current in the transformer secondary winding to be nearly flat-topped, said controller comprising, a switching circuit connected to the primary winding, a limit-current-commanding current-mode controller that controls the switching of the switching circuit between the on and off conditions delivering and interrupting respectively current to the transformer primary winding in response to the current flowing in at least one transformer winding to provide a sequence of short-duration nearly flat-topped current pulses to the primary winding interlaced with a sequence of short-duration nearly flat-topped delivery pulses from the secondary winding of prescribed amplitude to provide charge for charging said energy-storage capacitor to said predetermined voltage within said predetermined time interval from said energy source, wherein said limit-current-commanding current-mode controller is a peak-current-commanding-mode controller which controls the duration of the switching circuit on interval in response to the current flowing in the primary winding, and further comprising a feed-forward controller which controls the duration of the switching circuit off interval in response to the voltage provided by the secondary winding.

6. A flyback charger in accordance with claim 5 and further comprising, an energy-storage capacitor, and a unilaterally conducting device connecting the transformer secondary winding to the energy-storage capacitor.

7. In a flyback charger for charging an energy-storage capacitor to a predetermined voltage within a predetermined time interval from an energy source providing source voltage, apparatus comprising, a flyback transformer having at least a primary winding receiving said source voltage and a secondary winding, a controller for causing the energy-storage pulses of current in the transformer primary winding and the energy-delivery pulses of current in the transformer secondary winding to be nearly flat-topped, said controller comprising, a switching circuit connected to the primary winding, a limit-current-commanding current-mode controller that controls the switching of the switching circuit between the on and off conditions delivering and interrupting respectively current to the transformer primary winding in response to the current flowing in at least one transformer winding to provide a sequence of short-duration nearly flat-topped current pulses to the primary winding interlaced with a sequence of short-duration nearly flat-topped delivery pulses from the secondary winding of prescribed amplitude to provide charge for charging said energy-storage capacitor to said predetermined voltage within said predetermined time interval from said energy source, wherein each of said energy-delivery pulses of current in the transformer secondary winding is characterized by an initial value at the beginning of the pulse and a final value at the end of the pulse which final value is more than half of said initial value.

8. A flyback charger in accordance with claim 7 wherein said limit-current-commanding current-mode controller is a valley-current-commanding-mode controller which controls the duration of the switching circuit off interval in response to the current in the secondary winding, and further comprising a feed-forward controller which controls the duration of the switching circuit on interval in response to the voltage applied to the primary winding, such that the duration of the switching circuit on interval $T_{on}$ is defined substantially by $t_{on} = I_{P(pk)}(1-a) L/V_{CC}$ wherein $V_{CC}$ is the dc supply voltage actually applied to the switching circuit, L is the transformer primary winding inductance, a is greater than ½ and less than 1, and the value of $I_{P(pk)}$ is substantially defined by $I_{P(pk)} = (V_{Cf}^2/V_{CC} + 2nkV_{Cf})C/[kT_C(1+a)]$ wherein said switching circuit includes a capacitor of capacitance C that charges to a final voltage $V_{Cf}$ for a charging time interval $T_C$, k is the coefficient of coupling between the primary and secondary winding and n is the transformer secondary/primary turns ratio.

9. In a flyback charger for charging an energy-storage capacitor to a predetermined voltage within a predetermined time interval from an energy source providing source voltage, apparatus comprising, a flyback transformer having at least a primary winding receiving said source voltage and a secondary winding, a switching circuit connected to the primary winding, and a controller for causing the energy-storage pulses of current in the transformer primary winding and the energy-delivery pulses of current in the transformer secondary winding to be nearly flat-topped, said controller comprising, a controller that controls the switching of the switching circuit between the on and off conditions, delivering and interrupting, respectively, current to the transformer primary winding, a feed-forward controller controls the duration of the switching circuit off interval in response to the voltage provided by the secondary winding, and further comprising a timing circuit characterized by circuit components with parameter values that establish a fixed duration for the switching circuit on interval, to provide a sequence of short-duration nearly flat-topped current pulses to the primary winding interlaced with a sequence of short-duration nearly flat-topped delivery pulses from the secondary winding of prescribed amplitude to provide charge for charging said energy-storage capacitor to said predetermined voltage within said predetermined time interval from said energy source.

* * * * *

UNITED STATES PATENT AND TRADEMARK OFFICE
CERTIFICATE OF CORRECTION

PATENT NO. : 5,485,361
DATED : January 16, 1996
INVENTOR(S) : Nathan O. Sokal

It is certified that error appears in the above-indentified patent and that said Letters Patent is hereby corrected as shown below:

Column 5, line 25, after "and" should read --▲--.

Column 5, line 44, after "to" first occurrence, should read --▲--.

Column 11, line 9, "control" should read --Control--.

Column 11, line 21, "2" should read --0.2--.

Column 12, line 13, "$V_{cc}00$" should read --$V_{cc}))$--.

Signed and Sealed this

Twenty-fourth Day of June, 1997

*Attest:*

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,485,361
DATED : January 16, 1996
INVENTOR(S) : Nathan O. Sokal

It is certified that error appears in the above-indentified patent and that said Letters Patent is hereby corrected as shown below:

On the cover page, change "809 Massachusetts Ave." to --4 Tyler Road-- and "02173-3992" to --02420-2404--.

Column 5, line 58 change "(1+a)(1-k)" to --(1-k)/(1-a)--.

Column 5, line 62 change "(1+a)(1-k)" to --(1-k)/(1-a)--.

Signed and Sealed this

Fourth Day of August, 1998

Attest:

BRUCE LEHMAN

Attesting Officer    Commissioner of Patents and Trademarks